United States Patent
Hassan

(10) Patent No.: US 12,271,758 B2
(45) Date of Patent: Apr. 8, 2025

(54) MULTI-TENANCY INTERFERENCE MODEL FOR SCALING IN CONTAINER ORCHESTRATION SYSTEMS

(71) Applicant: SAP SE, Walldorf (DE)

(72) Inventor: Ahmad Hassan, Maidenhead (GB)

(73) Assignee: SAP SE, Walldorf (DE)

( * ) Notice: Subject to any disclaimer, the term of this patent is extended or adjusted under 35 U.S.C. 154(b) by 618 days.

(21) Appl. No.: 17/495,017

(22) Filed: Oct. 6, 2021

(65) Prior Publication Data
US 2023/0104787 A1    Apr. 6, 2023

(51) Int. Cl.
*G06F 9/50* (2006.01)
*G06F 11/34* (2006.01)

(52) U.S. Cl.
CPC .......... *G06F 9/5044* (2013.01); *G06F 9/5077* (2013.01); *G06F 11/3428* (2013.01)

(58) Field of Classification Search
CPC ... G06F 9/5044; G06F 9/5077; G06F 11/3428
USPC ....................................................... 718/104
See application file for complete search history.

(56) References Cited

U.S. PATENT DOCUMENTS

| | | | |
|---|---|---|---|
| 9,143,412 B1 | 9/2015 | Nay et al. | |
| 9,726,502 B2 | 8/2017 | Ni et al. | |
| 9,778,051 B2 | 10/2017 | Vo et al. | |
| 10,360,263 B2 | 7/2019 | Ni et al. | |
| 11,157,338 B2 | 10/2021 | Rodean et al. | |
| 11,222,066 B1 | 1/2022 | Batsakis et al. | |
| 11,843,545 B1* | 12/2023 | Vasamsetti | H04L 47/765 |
| 11,860,899 B2 | 1/2024 | Hassan | |
| 2014/0040474 A1* | 2/2014 | Blagodurov | G06F 9/5094 709/226 |
| 2014/0193154 A1* | 7/2014 | Graham | H04L 41/0816 398/79 |
| 2015/0154057 A1* | 6/2015 | McGrath | G06F 9/5077 718/1 |
| 2016/0054782 A1 | 2/2016 | Kaburlasos et al. | |
| 2016/0373327 A1 | 12/2016 | Degioanni et al. | |
| 2018/0152958 A1* | 5/2018 | Arnold | H04L 41/5009 |
| 2018/0288129 A1 | 10/2018 | Joshi et al. | |
| 2019/0036808 A1* | 1/2019 | Shenoy | H04L 45/64 |
| 2019/0102226 A1* | 4/2019 | Caldato | G06F 9/5072 |
| 2020/0371950 A1* | 11/2020 | Gupta | G06N 20/00 |
| 2021/0034673 A1 | 2/2021 | Ni et al. | |
| 2021/0191762 A1 | 6/2021 | Ocray, Jr. et al. | |
| 2021/0191769 A1 | 6/2021 | Eschinger et al. | |
| 2021/0357376 A1* | 11/2021 | Jain | G06F 16/285 |

(Continued)

OTHER PUBLICATIONS

U.S. Appl. No. 17/488,422, Ni, filed Sep. 29, 2021.

(Continued)

*Primary Examiner* — April Y Blair
*Assistant Examiner* — Ross Michael Vincent
(74) *Attorney, Agent, or Firm* — Fish & Richardson P.C.

(57) ABSTRACT

Methods, systems, and computer-readable storage media for an autoscaling framework that uses a multi-tenant interference model for selectively scaling resources in container orchestration systems based on an estimated performance, an actual performance, and a violation count of each resource unit of a plurality of resource units. In some implementations, the autoscaling framework of the present disclosure mitigates length of response times in applications composed of a set of services.

20 Claims, 5 Drawing Sheets

(56) References Cited

U.S. PATENT DOCUMENTS

| | | | |
|---|---|---|---|
| 2022/0244949 A1 | 8/2022 | Iqbal et al. | |
| 2022/0245003 A1* | 8/2022 | Oh | G06F 9/5077 |
| 2022/0374284 A1* | 11/2022 | Kirmse | G06F 9/5055 |
| 2022/0413992 A1* | 12/2022 | Nguyen | G06F 11/3428 |
| 2023/0040676 A1 | 2/2023 | Kita et al. | |
| 2023/0094159 A1 | 3/2023 | Difranco et al. | |
| 2023/0109368 A1* | 4/2023 | Ni | G06T 1/20 718/104 |
| 2023/0124068 A1 | 4/2023 | Hassan | |

OTHER PUBLICATIONS

Brewer, "Kubernetes the path to cloud native." Proceedings of the sixth ACM symposium on cloud computing, Aug. 2015, 27 pages.

Cox et al., "Serverless inferencing on Kubernetes." arXiv preprint arXiv:2007.07366, Jul. 2020, 5 pages.

Docs.Oracle.com [online], "2.6 The JCMD Utility" Sep. 2015 [retrieved on Sep. 29, 2021], retrieved from : URL <https://docs.oracle.com/javase/8/docs/technotes/guides/troubleshoot/tooldescr006.html>, 4 pages.

LeCun et al., "Deep learning." nature 521.7553, May 2015, 9 pages.

Prometheus.io [online], "Prometheus—Monitoring System and Time Series Database" Jan. 2015 [retrieved on Sep. 29, 2021], retrieved from : URL <https://prometheus.io/>, 5 pages.

Thurgood et al., "Cloud computing with Kubernetes cluster elastic scaling." Proceedings of the 3rd International Conference on Future Networks and Distributed Systems, Jul. 2019, 7 pages.

Wei-Guo et al., "Research on Kubernetes' Resource Scheduling Scheme." Proceedings of the 8th International Conference on Communication and Network Security, Nov. 2018, 5 pages.

Medium.com [online], "How We Maintain Tenant Data Isolation With Kafka at Scale" Dec. 2020, retrieved on Jun. 17, 2024, retrieved from URL <https://medium.com/gong-tech-blog/how-we-use-kafka-to-maintain-tenant-data-isolation-at-scale-ad501f2dc572>, 20 pages.

Non-Final Office Action in U.S. Appl. No. 17/488,422, mailed on Mar. 27, 2024, 19 pages.

Non-Final Office Action in U.S. Appl. No. 17/503,560, mailed on Jun. 23, 2023, 11 pages.

\* cited by examiner

MULTI-TENANCY INTERFERENCE MODEL FOR SCALING IN CONTAINER ORCHESTRATION SYSTEMS

BACKGROUND

Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. A common architecture in cloud platforms includes services (also referred to as microservices), which have gained popularity in service-oriented architectures (SOAs). In such SOAs, applications are composed of multiple, independent services that are deployed in standalone containers with well-defined interfaces. The services are deployed and managed within the cloud platform and run on top of a cloud infrastructure.

For example, a software vendor can provide an application that is composed of a set of services that are executed within a cloud platform. Each service is itself an application (e.g., a Java application) and one or more instances of a service can execute within the cloud platform. In some examples, multiple tenants (e.g., users, enterprises) use the same application. Consequently, each service is multi-tenant aware (i.e., manages multiple tenants) and provides resource sharing (e.g., network throughput, database sharing, hypertext transfer protocol (HTTP) restful request handling on application programming interfaces (APIs)). In multi-tenant deployments, if a tenant overloads the system, other tenants experience slower response times in their interactions with the application. This is referred to as multi-tenant interference and can result in violations of service level agreements (SLAs), such as response times that are slower than expected response times.

In modern software deployments, containerization is implemented, which can be described as operating system (OS) virtualization. In containerization, services are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

The container orchestration system can scale a number of containers, and thus resources to execute an application. For example, Kubernetes provides an autoscaling feature, which increases available resources as demand increases and decreases available resources as the demand decreases. In some scenarios, scaling can be based on utilization of resources (e.g., central processing unit (CPU) utilization). However, container orchestration systems are absent detection of instances of multi-tenant interference or adverse impact on SLAB, and therefore, do not scale containers directly in response thereto.

SUMMARY

Implementations of the present disclosure are directed to an autoscaling framework for scaling in container orchestration systems. More particularly, and as described in further detail herein, the present disclosure provides a multi-tenant interference model for selectively scaling resources in container orchestration systems based on an estimated performance, an actual performance, and a violation count of each resource unit of a plurality of resource units. In some implementations, and as described in further detail herein, the autoscaling framework of the present disclosure mitigates length of response times in applications composed of a set of services. For example, the autoscaling framework of the present disclosure enables response times to be below a threshold time.

In some implementations, actions include executing, within the container orchestration system, a set of resource units, each resource unit including an application container executing an instance of an application, receiving, for a first resource unit in the set of resource units, a first set of utilization metrics representing hardware utilization for the first resource unit, determining that at least one utilization metric in the first set of utilization metrics exceeds a respective threshold, and in response, determining whether an actual performance of the first resource unit is greater than or equal to an expected performance of the first resource unit, and in response to determining that the actual performance of the first resource unit is greater than or equal to the expected performance of the first resource unit, determining whether a first violation count of the first resource unit is greater than or equal to a threshold violation count, and in response to determining that the first violation count of the first resource unit is greater than or equal to a threshold violation count, transmitting a message for receipt by a scaling component, and selectively scaling, by an autoscaler, a number of resource units within the container orchestration system at least partially based on the message. Other implementations of this aspect include corresponding systems, apparatus, and computer programs, configured to perform the actions of the methods, encoded on computer storage devices.

These and other implementations can each optionally include one or more of the following features: actions further include determining that at least one utilization metric in a second set of utilization metrics exceeds a respective threshold, the second set of utilization metrics representing hardware utilization for the second resource unit, and in response, determining whether an actual performance of the second resource unit is greater than or equal to an expected performance of the first resource unit, and in response to determining that the actual performance of the second resource unit is greater than or equal to the expected performance of the second resource unit, determining whether a second violation count of the second resource unit is greater than or equal to the threshold violation count, and in response to determining that the second violation count is less than the threshold violation count, incrementing the second violation count; actions further include determining that at least one utilization metric in a second set of utilization metrics exceeds a respective threshold, the second set of utilization metrics representing hardware utilization for a second resource unit, and in response, determining whether an actual performance of the second resource unit is greater than or equal to an expected performance of the first resource unit, wherein scaling the number of resource units is absent influence of a second violation count of the second resource unit in response to determining that the actual performance of the second resource unit is less than the expected performance of the second resource unit; actions further include determining that no utilization metric in a second set of utilization metrics exceeds a respective threshold, the second set of utilization metrics representing hardware utilization for a second resource unit, and in response, scaling the number of resource units is absent influence of a second violation count of the second resource unit; the first set of utilization metrics includes a processor utilization and a memory utilization of the first resource unit; actions further include calculating the expected performance at least partially based on an optimal thread count and calculating an actual performance at least partially based on a number of running threads; and the container orchestration system includes Kubernetes and each resource unit comprises a pod.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
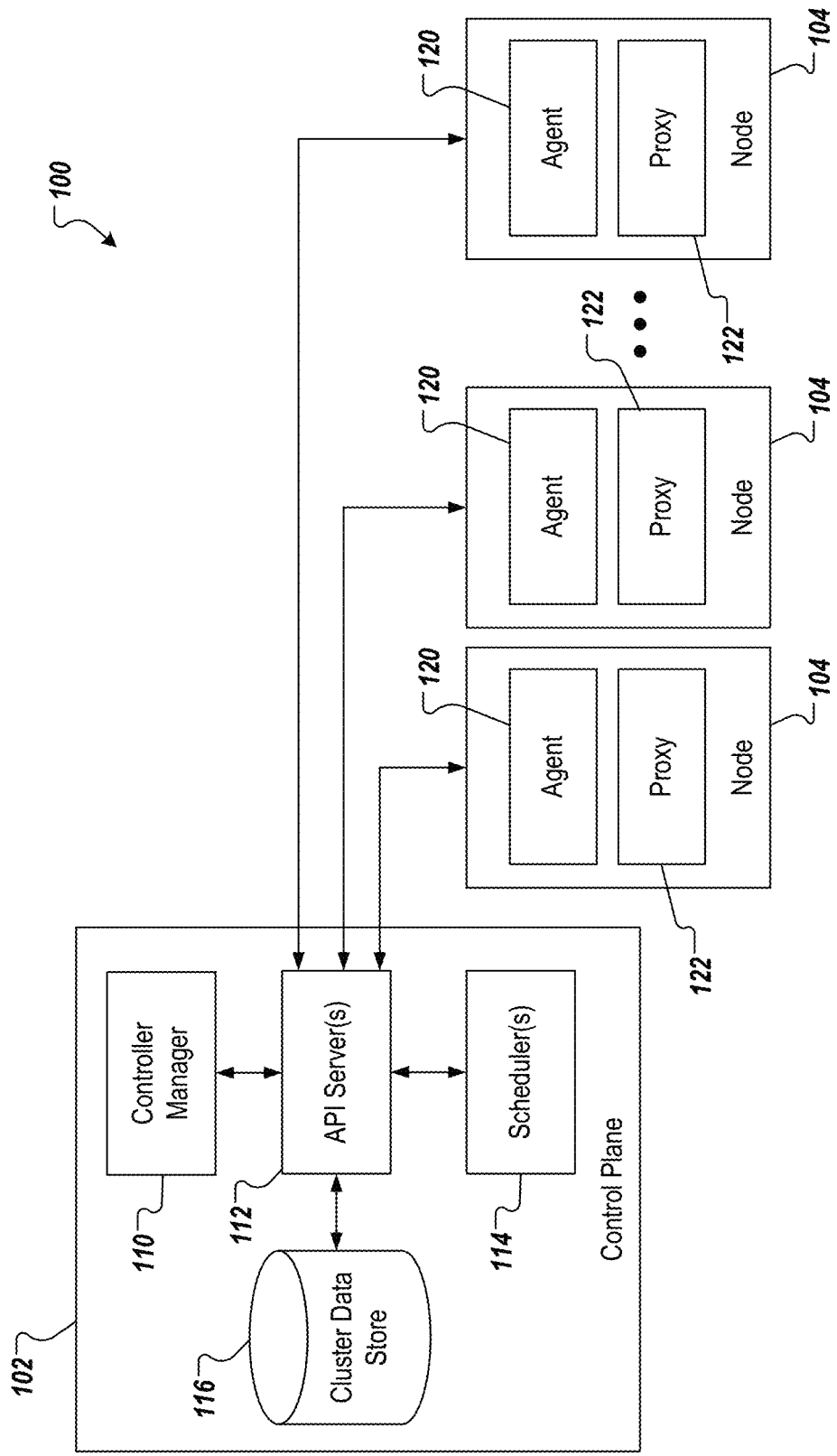
FIG. 1 depicts an example container orchestration architecture.

Implementations of the present disclosure are directed to an autoscaling framework for scaling in container orchestration systems. More particularly, and as described in further detail herein, the present disclosure provides a multi-tenant interference model for selectively scaling resources in container orchestration systems based on an estimated performance, an actual performance, and a violation count of each resource unit of a plurality of resource units. In some implementations, and as described in further detail herein, the autoscaling framework of the present disclosure mitigates length of response times in applications composed of a set of services. For example, the autoscaling framework of the present disclosure enables response times to be below a threshold time.

In some implementations, actions include executing, within the container orchestration system, a set of resource units, each resource unit including an application container executing an instance of an application, receiving, for a first resource unit in the set of resource units, a first set of utilization metrics representing hardware utilization for the first resource unit, determining that at least one utilization metric in the first set of utilization metrics exceeds a respective threshold, and in response, determining whether an actual performance of the first resource unit is greater than or equal to an expected performance of the first resource unit, and in response to determining that the actual performance of the first resource unit is greater than or equal to the expected performance of the first resource unit, determining whether a first violation count of the first resource unit is greater than or equal to a threshold violation count, and in response to determining that the first violation count of the first resource unit is greater than or equal to a threshold violation count, transmitting a message for receipt by a scaling component, and selectively scaling, by an autoscaler, a number of resource units within the container orchestration system at least partially based on the message.

To provide further context for implementations of the present disclosure, and as introduced above, cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand. A common architecture in cloud platforms includes services (also referred to as microservices), which have gained popularity in service-oriented architectures (SOAs). In such SOAs, applications are composed of multiple, independent services that are deployed in stand-alone containers with well-defined interfaces. The services are deployed and managed within the cloud platform and run on top of a cloud infrastructure.

For example, a software vendor can provide an application that is composed of a set of services that are executed within a cloud platform. By way of non-limiting example, an electronic commerce (e-commerce) application can be composed of a set of 20-30 services, each service performing a respective function (e.g., order handling, email delivery, remarking campaigns, handling and payment). Each service is itself an application (e.g., a Java application) and one or more instances of a service can execute within the cloud platform. In some examples, such as in the context of e-commerce, multiple tenants (e.g., users, enterprises) use the same application. For example, and in the context of e-commerce, while a brand (e.g., an enterprise) has their individual web-based storefront, all brands share the same underlying services. Consequently, each service is multi-tenant aware (i.e., manages multiple tenants) and provides resource sharing (e.g., network throughput, database sharing, hypertext transfer protocol (HTTP) restful request handling on application programming interfaces (APIs)). In multi-tenant deployments, if a tenant overloads the system, other tenants experience slower response times in their interactions with the application. This is referred to as multi-tenant interference and can result in violations of service level agreements (SLAs), such as response times that are slower than expected or guaranteed response times.

In modern software deployments, containerization is implemented, which can be described as operating system (OS) virtualization. In containerization, services are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

An attractive feature of Kubernetes is scalability, which allows the applications and infrastructures hosted to scale in and out on demand. Kubernetes manages containers within pods, which are the smallest deployable objects in Kubernetes. Each pod can contain one or more containers, and the containers in the same pod share resources of the pod (e.g., networking and storage resources). Applications, such as services, can be defined as Kubernetes deployments, which are backed by a number of identical pods running application containers. The number of pods can also be referred to as the number of replicas. The service is exposed to the externals of the Kubernetes cluster through a Kubernetes service (also referred to as ingress). The autoscaling feature of Kubernetes is realized by a component called a horizontal pod autoscaler, which periodically scales the number of pods in a deployment by checking a metric. In traditional approaches, example metrics have included, without limitation, average central processing unit (CPU) utilization and memory utilization. However, container orchestration systems, such as Kubernetes, are absent detection of instances of multi-tenant interference and/or adverse impact on SLAs, and therefore, do not scale containers directly in response thereto.

In view of the above context, implementations of the present disclosure provide an autoscaling framework including a multi-tenant interference model for selectively scaling resources in container orchestration systems based on an estimated performance, an actual performance, and a violation count of each resource unit of a plurality of resource units. More particularly, and as described in further detail herein, SLA enforcer functionality checks traditional metrics (e.g., CPU utilization, memory utilization) as initial indicators of multi-tenant interference resulting in slow response times, and checks the estimated performance and the actual performance as primary indicators of multi-tenant interference. In response to a threshold number of instances of slow response times, the autoscaling framework of the present disclosure scales out one or more resource units (e.g., pods). As described in further detail herein, the autoscaling framework of the present disclosure mitigates length of response times in applications composed of a set of services. For example, the autoscaling framework of the present disclosure enables response times to be below a threshold time.

Implementations of the present disclosure are described in further detail herein with reference to an example context. The example context includes an e-commerce context, in which multiple enterprises (e.g., a brands) use an application provided by a software vendor, the application being composed of a set of services that are executed within a container orchestration system of a cloud platform. In the example e-commerce context, the enterprises can include respective web-based front-ends, through which users (e.g., customers) can interact with the application. In some examples, each web-based front-end is provided as a progressive web application, which can be described as a type of application software (e.g., programmed using hypertext mark-up language (HTML), cascading style sheets (CSS), and/or JavaScript) delivered through the Internet, and intended to work on platforms that use standards-compliant browsers (e.g., desktop, mobile). In the e-commerce context, a user can browse a catalog of products and/or services and can make purchases through the web-based front-end. User interactions with the application result in requests being transmitted to one or more services for handling. For example, user interactions can result in functionality that is performed by one or more services (e.g., order handling, email delivery, remarking campaigns, handling and payment).

While implementations of the present disclosure are described herein with reference to the e-commerce context, it is contemplated that implementations of the present disclosure can be realized in any appropriate context.

FIG. 1 depicts an example container orchestration architecture 100 in accordance with implementations of the present disclosure. In the depicted example, the example container orchestration architecture 100 represents deployment of a portion of the container orchestration system Kubernetes introduced above. More particularly, the example architecture 100 represents a basic structure of a cluster within Kubernetes In the example of FIG. 1, the example architecture 100 includes a control plane 102 and a plurality of nodes 104. Each node 104 can represent physical worker machines and are configured to host pods. In Kubernetes, a pod is the smallest deployable unit of resources and each pod is provided as one or more containers with shared storage/ network resources, and a specification for how to run the containers. In some examples, a pod can be referred to as a resource unit that includes an application container. The control plane 102 communicates with the nodes 104 and is configured to manage all of the nodes 104 and the pods therein.

In further detail, the control plane 102 is configured to execute global decisions regarding the cluster as well as detecting and responding to cluster events. In the example of FIG. 1, the control plane 102 includes a control manager 110, one or more application programming interface (API) server(s) 112, one or more scheduler(s) 114, and a cluster data store 116. The API server(s) 112 communicate with the nodes 104 and exposes the API of Kubernetes to exchange information between the nodes 104 and the components in the control plane 102 (e.g., the cluster data store 116). In some examples, the control plane 102 is set with more than one API server(s) 112 to balance the traffic of information exchanged between the nodes 104 and the control plane 102. The scheduler(s) 114 monitor the nodes 104 and execute scheduling processes to the nodes 104. For example, the scheduler(s) 114 monitors events related to newly created pods and selects one of the nodes 104 for execution, if the newly created pods are not assigned to any of the nodes 104 in the cluster.

The cluster data store 116 is configured to operate as the central database of the cluster. In this example, resources of the cluster and/or definition of the resources (e.g., the required state and the actual state of the resources) can be stored in the cluster data store 116. The controller manager 110 of the control plane 102 communicates with the nodes 104 through the API server(s) 112 and is configured to execute controller processes. The controller processes can include a collection of controllers and each controller is responsible for managing at least some or all of the nodes 104. The management can include, but is not limited to, noticing and responding to nodes when an event occurs, and monitoring the resources of each node (and the containers in each node). In some examples, the controller in the controller manager 110 monitors resources stored in the cluster data store 116 based on definitions of the resource. As introduced above, the controllers also verify whether the actual state of each resource matches the required state. The controller is able to modify or adjust the resources, so that actual state matches the required state depicted in the corresponding definition of the resources.

In some examples, the controllers in the controller manager 110 should be logically independent of each other and be executed separately. In some examples, the controller processes are all compiled into one single binary that is executed in a single process to reduce system complexity. It is noted the control plane 102 can be run/executed on any machine in the cluster. In some examples, the control plane 102 is run on a single physical worker machine that does not host any pods in the cluster.

In the example of FIG. 1, each node 104 includes an agent 120 and a proxy 122. The agent 120 is configured to ensure that the containers are appropriately executing within the pod of each node 104. The agent 120 is referred to as a kubelet in Kubernetes. The proxy 122 of each node 104 is a network proxy that maintains network rules on nodes 104. The network rules enable network communication to the pods in the nodes 104 from network sessions inside or outside of the cluster. The proxy 122 is a kube-proxy in Kubernetes.

Figure 2:
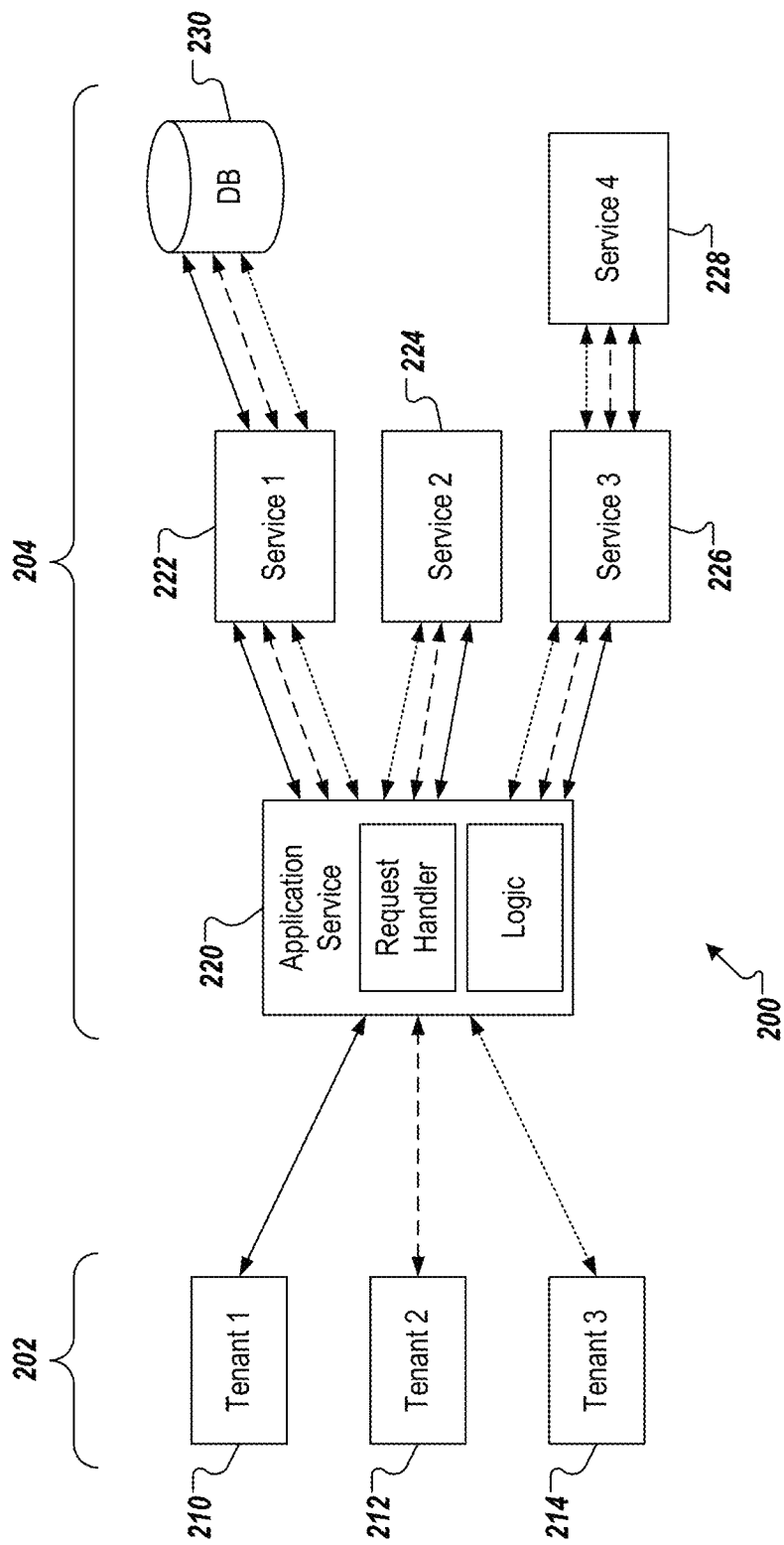
FIG. 2 depicts a conceptual representation of an application hosted in a cloud platform.

FIG. 2 depicts a conceptual representation of an application 200 hosted in a cloud platform. In the example of FIG. 2, a front-end 202 and a back-end 204 are depicted, the back-end 204 representing a cloud platform. The front-end 202 includes front-end components 210, 212, 214 associated with respective tenants (e.g., enterprises). For example, each front-end component 210, 212, 214 can be provided as a web-based front-end, through which users (e.g., customers) can interact with the application 200. For example, in the e-commerce context, the front-end components 210, 212, 214 can be provided as browser-based store front-ends of respective enterprises that enable customers of the respective enterprises to peruse products and make purchases.

In the example of FIG. 2, the application 200 is a service-based application and includes an application service 220 and services 222, 224, 226, 228. In the depicted example, the service 222 interacts with a database system 230. In some examples, the application service 202 functions as a gateway between the front-end components 210, 212, 214 and the services 222, 224, 226, 228. For example, the front-end components 210, 212, 214 and the application service 220 can be provided by a software vendor, while one or more of the services 222, 224, 226, 228 and/or the database system 230 can be provided by another software vendor.

In some examples, the application service 220 handles requests received from one or more of the front-end components 210, 212, 214. For example, the application service 220 can itself include logic that can process a request from one of the front-end components 210, 212, 214 and provide a response to the front-end component 210, 212, 214. As another example, the application service 220 can include a request handler to forward requests to one or more of the services 222, 224, 226, 228. For example, each service 222, 224, 226, 228 executes particularized functionality to provide a response to a request, or at least a portion of a request. In this sense, and for the functionality executed by and data received from the services 222, 224, 226, 228, the application service 220 functions as a proxy. In some examples, the application service 220 receives a request, breaks down the request into one or more sub-requests (e.g., specialized requests) and forwards the one or more sub-requests to respective services 222, 224, 226, 228. The application service 220 receives responses from the respective services 222, 224, 226, 228, and packages the responses into a single response back to the front-end component 210, 212, 214 that issued the original request. In this sense, the application service 220 can be described as an aggregator of data returned by the services 222, 224, 226, 228. In some examples, the application service 220 and the services 222, 224, 226, 228 take incoming requests through multiple channels. An example channel includes representational state transfer (REST) controllers for HTTP requests (e.g., GET, PUT, POST, DELETE). Another example channel is through messaging systems (e.g., messaging queue listeners, consumers, such as Kafka and Rabbit).

With reference to the non-limiting context of e-commerce, a request from the front-end component 210 can be received by the application service 220. For example, the request can be issued by a user to request display of products that are available through the e-commerce site of an enterprise, here, a first tenant (Tenant 1). In response to the request, the application service 220 can determine that a page is to be displayed in the front-end component 210 and can determine that product information and product suggestions are to be displayed in the page. The application service 220 can issue a sub-request to the service 222, which is, in this example, a product catalog service. The service 222 retrieves product catalog data from the database system 230 and provides a response to the application service 220, which response includes the product catalog data. The application can issue a sub-request to the service 224, which is, in this example, a product suggestions service (e.g., executing a recommendation engine). The service 224 provides product recommendation data in a response to the application service 220. The application service 220 aggregates the product catalog data and the product recommendation data and provides a response to the front-end component 210 to display a page depicting the product catalog data and the product recommendation data (e.g., as images and/or text).

Continuing with this example, the user can decide to purchase a product by selecting the product and providing payment information represented in a request to the application service 220. The application service 220 can send a sub-request to the service 226, which, in this example, is a payment handling service. In this example, the service 226 can send a sub-request to the service 228, which, in this example, is a payment verification service (e.g., a credit card service that provides purchase approvals/denials). The service 228 provides a response to the service 226, which provides a response to the application service 220. The application service 220 provides a response to the front-end component 210 (e.g., instructions to display purchase approval/denial to the user).

As a cloud-based application, the components of the back-end 204 are executed within containers of a container orchestration system, such as Kubernetes. As introduced above, a container is defined as a standalone unit of software that is packaged with application (service) code along with all dependencies of the application (service) to run as a single application (service). In the example of FIG. 2, because the application 200 supports multiple tenants (e.g., multiple enterprises having respective e-commerce sites powered by the application 200), each of the components is tenant-aware. That is, for example, the application service 220 discerns a tenant of a set of tenants based on data provided in the request (e.g., data indicating which tenant is the source of the request) to, in response to the request, provide instructions to display a page that is particular to the tenant (e.g., includes the logo, branding, and the like of the particular tenant). As another example, the service 222 discerns a tenant of the set of tenants based on data provided in the sub-request (e.g., data indicating which tenant is the sub-request is sent on behalf of) to, in response to the sub-request, provide product catalog data that is particular to the tenant (e.g., includes the products offered for sale by the particular tenant).

As discussed above, in multi-tenant application scenarios, multi-tenant interference can occur, which can result in decreasing response time from services (e.g., the application service 220, the services 222, 224, 226, 228) and/or underlying backing systems (e.g., the database system 230). Traditional metrics representative of resource performance, however, are not strict indicators of occurrences of multi-tenant interference. Such traditional metrics can include CPU utilization and memory utilization of container resources. For example, although CPU utilization and/or memory utilization of a container may be higher than desired (e.g., exceeding respective thresholds), the resulting response times may still be acceptable (e.g., not slow enough to violate a SLA). Consequently, although CPU utilization and/or memory utilization may be higher than desired, scaling of containers is not required.

As described in further detail herein, the autoscaling framework of the present disclosure selectively scales a number of resource units (e.g., pods) executing a service (e.g., the application service 220, the services 222, 224, 226, 228) based on a multi-tenant interference model. As described in further detail herein, the multi-tenant interference model provides non-traditional resource unit performance metrics representative of potential occurrences of multi-tenant interference. In some implementations, the multi-tenant interference model combines the non-traditional resource unit performance metrics with traditional resource unit performance metrics (e.g., CPU utilization, memory utilization) in determining occurrences of multi-tenant interference.

In further detail, and as introduced above, an application can be composed of a set of services deployed within a cloud platform using resource units. In the context of Kubernetes, a resource unit is a pod, each pod including one or more containers. All containers of a pod are scheduled on the same host and share the network namespace. The application can execute in the cloud platform with n number of application instances, each application instance being executed within a container. Within a container orchestration system, such as Kubernetes, an application can be conceptually represented as:

$$\text{application} = \sum_{i=1}^{n} \text{containers}$$

Consequently, in Kubernetes, the application can be deployed using n pods.

The pods provide consistency, because containers within a pod run the same regardless of where they are deployed. Containers are extremely useful for deployed services in cloud platforms through continuous deployment and integration delivery (CICD). In general, there are multiple layers within a container with the lowest layer being the infrastructure layer (e.g., Infrastructure-as-a-Service (IaaS) from a service cloud provider). The OS layer runs on top of the infrastructure layer. A container manager runs on the OS and provides the interface to execute the application inside the container context. On top of the container, a runtime (e.g., Docker) is executed, which enable building and running of containers within pods. A repository (e.g., Docker Hub) is provided to store images that are used to instantiate containers. As introduced above, in Kubernetes, an application, such as a service (e.g., the application service 220, the services 222, 224, 226, 228) that provides a portion of functionality of an overall application, is executed within a pod. A single pod runs a single instance of the application at a given time. A pod can be quickly spun-up, scaled, and terminated based on resource demand.

When multiple tenants (e.g., multiple enterprises) are using the application, and thus, the services underlying the application, all traffic (e.g., requests of the enterprises collectively) goes through the pod to the service running in the pod. If a single tenant is overloading a service, then the pod executing that service becomes affected in terms of response times. That is, response times from the pod slow for all tenants, even though one tenant is the source of the overload situation. Moreover, if a pod is connected to backing services, cloud platform SLAs can be compromised. Example backing services can include, without limitation, a messaging platform (e.g., Kafka Messaging, Rabbit Messaging), and a database system (e.g., SAP HANA).

In view of this, the autoscaling framework of the present disclosure provides a multi-tenant interference model that uses estimated pod performance (EPP) and real (actual) pod performance (RPP) to identify potential instances of multi-tenant interference resulting in SLA violations. Here, EPP and RPP can be referred to as non-traditional metrics of resource unit (pod) performance. In response to an SLA violation being indicated, a message is provided to trigger scaling (e.g., increasing the number of pods).

In further detail, each service can support a multi-threading based single process paradigm, in which the service is executed as a single process, but multiple threads handle the incoming requests. Having too many threads, however, can be a bottleneck, because too many threads can also lead to switching overhead in the processor scheduler. Consequently, an optimum number of threads (thread count) per service is desired for application performance. However, an optimal thread count is not an option that can be configured for all services as a static number. Instead, for example, the thread count depends on the average incoming requests per second and the bottleneck imposed by any underlying backing service (e.g., the number of concurrent connections and threads supported by an underlying database systems). In some examples, the thread count is determined by executing various workloads on the deployed system and adjusting the thread count until an optimal thread count is achieved in terms of application throughput. For purposes of the instant application, the thread count for a pod is provided as a pre-determined value.

In some implementations, an EPP is calculated for each pod i (where i=1, . . . , n) executing a service. In some examples, EPP is calculated using the following example relationship:

$$EPP_i = \left(\frac{m}{n}\right) + t_{opt} \quad (1)$$

where m is a number of queue partitions, n is the number of pods (executing the same service), and $t_{opt}$ is the optimal thread count. In some implementations, a RPP is calculated for each pod i (where i=1, . . . , n) executing a service. The number of queue partitions refers to a messaging queue (e.g., Apache Kafka). In some examples, partitioning is a logical division of a topic within the queue. If a topic is divided into 10 partitions (e.g., m=10), there are 10 logical channels for messaging. The messages within the partitions are guaranteed to be in order by a message key, which dictates which partition to use for a given message. In some examples, EPP is the same value for all pods. In some examples, $RPP_i$ is calculated using the following example relationship:

$$RPP_{i,x}(k) = \Sigma_i^t Th_{run} + Th_{wait} + Th_{timed-wait} \quad (2)$$

where $RPP_{i,x}(k)$ is the RPP of pod i in a duration x at time k, $Th_{run}$ indicates a number of runnable threads (e.g., threads that are available for processing), $Th_{wait}$ indicates a number of threads that are executing, but waiting for other threads to finish a tasks without time limit, $Th_{timed-wait}$ indicates a number of threads that are executing, but waiting for other threads to finish a tasks with a time limit, and t is the number of threads available for the pod. In some examples, values for $Th_{ran}$, $Th_{wait}$, and $Th_{timed-wait}$ are collected as metrics by a monitoring service, such as Prometheus, discussed in further detail herein.

Implementations of the present disclosure provide SLA enforcer functionality that embodies the multi-tenant interference model. More particularly, the SLA enforcer functionality processes metrics for each pod to track SLA violations of pods over time, and selectively scale pods based on respective SLA violations. More particularly, a SLA violations count (SLA_VIOLATION) for each pod is determined over a time period (e.g., the duration x). SLA_VIOLATION is initialized to zero (0) at the start of the time period. EPP and RPP are determined for each pod at each interval (e.g., time k) of a plurality of intervals within the time period. In some examples, utilization metrics are determined for the pod and are compared to respective thresholds. Example utilization metrics include CPU utilization ($U_{CPU}$) and memory utilization ($U_{MEM}$). If either of the utilization metrics does not meet or exceed a respective threshold, the next interval in the time period is considered. If the utilization metrics meet or exceed respective thresholds, RPP and EPP are compared to each other and SLA_VIOLATION is compared to a threshold. If RPP does not meet or exceed EPP and/or SLA_VIOLATION does not meet or exceed the threshold, the next interval in the time period is considered. If RPP meets or exceeds EPP, but SLA_VIOLATION does not meet or exceed the threshold, SLA_VIOLATION is incremented and the next interval in the time period is considered. If RPP meets or exceeds EPP and SLA_VIOLATION meets or exceeds the threshold, a message is transmitted to trigger scaling of the pod in question.

Figure 3:
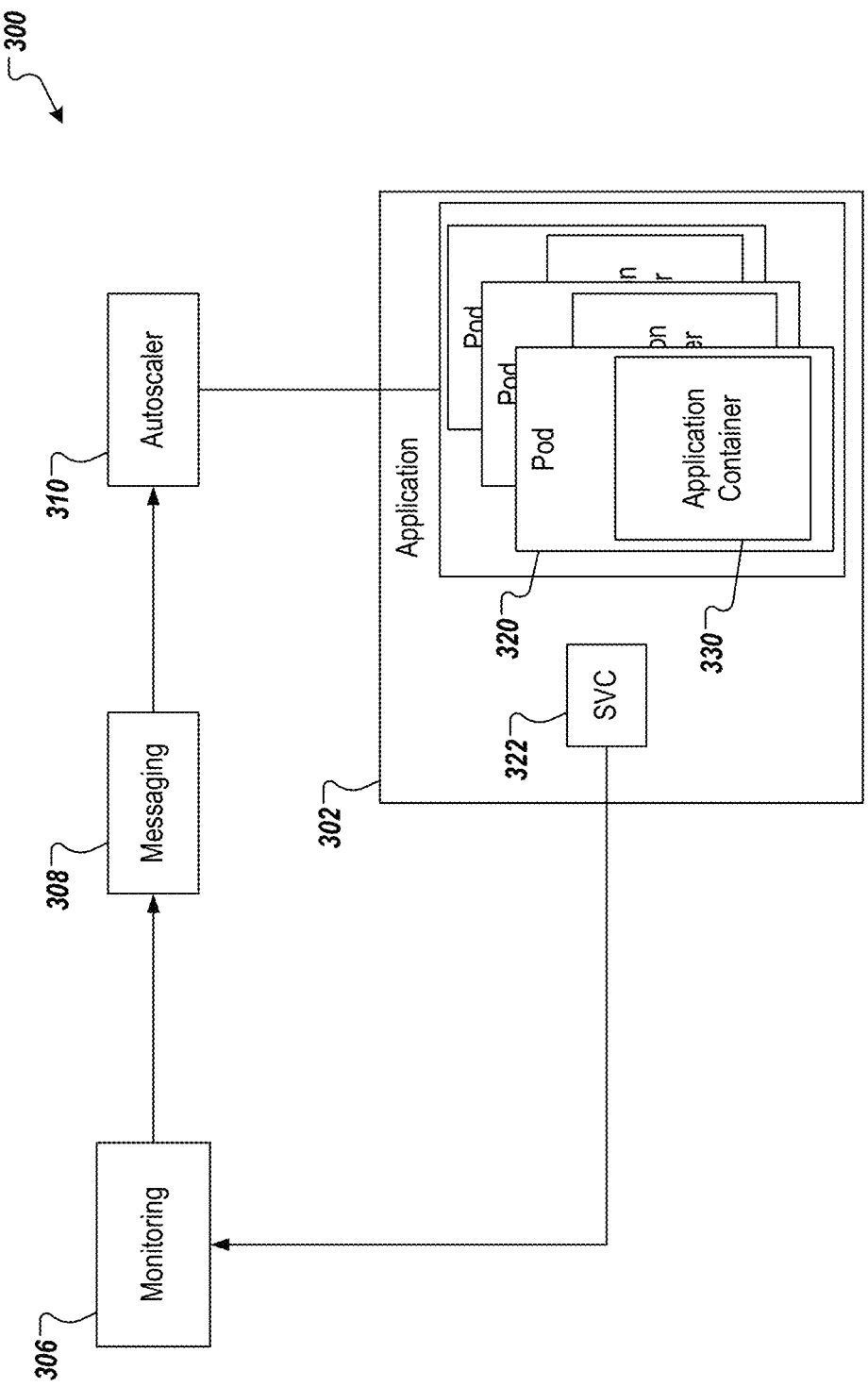
FIG. 3 depicts an example architecture that can be used to execute implementations of the present disclosure.

FIG. 3 depicts an example architecture 300 that can be used to execute implementations of the present disclosure. More particularly, the example architecture of FIG. 3 incorporates the autoscaling framework of the present disclosure. In the example of FIG. 3, the example architecture 300 includes an application 302, a monitoring component 306, a messaging system 308, and an autoscaler 310.

In some examples, the application 302 is composed of a set of services. Further, the application 302 is multi-tenant aware, in that the application 302 is configured to handle requests from multiple tenants. For example, a tenant can include an enterprise (e.g., a brand) and a request can be transmitted from a computing system during an operation associated with the enterprise. In the example of FIG. 3, the application 302 is executed using pods 320 (also referred to as resource units herein) and includes a service 322 for communicating with other components, as described herein. As used herein, the term autoscale refers to automatically changing (scaling) a number of pods 320 in response to instructions received from the autoscaler 310. This scaling is executed automatically indicating that human intervention is absent in determining when and how (e.g., up, down) the pods 320 are scaled. In some examples, scaling out of the application 302 (i.e., increasing the number of pods 320) can include allocating a new node and installing a driver for instantiation of a (new) pod 320.

Each pod 320 includes an application container 330, which can be described as an independent, self-contained unit that includes binaries of the application 302 as well as the software dependencies and the hardware requirements needed to run the application 302. In this manner, each pod 320 handles requests, which requests can originate from one or more tenants. Accordingly, each pod 320 is tenant-aware in that the pod 320 is able to track tenants to receive requests from and provide responses to respective tenants.

The service 322 enables communication with the application 302. In some examples, the service 322 communicates using one of a plurality of ports depending on the type of communication. For example, the application 302 can be exposed for communication through a first port (e.g., port 8500, port 7070). Metrics associated with the resources executing the application 302 are exposed for communication through a second port that is different from the first port (e.g., port 9400). In the example of FIG. 3, the service 322 communicates resource metrics to the monitoring component 306 through the second port.

In accordance with implementations of the present disclosure, the application 302 is autoscaled by selectively increasing or decreasing the number of pods 320 executing the application 302. For example, for heavier loads (e.g., a relatively high demand on the application 302), the number of pods 320 is increased and, for lighter loads (e.g., relatively low demand on the application 302), the number of pods 320 is decreased. As described in further detail herein, the autoscaler 310 automatically scales the pods 320 based on the multi-tenant interference model of the present disclosure.

In further detail, a set of metrics can be provided for the application 302, the set of resource metrics representing resource consumption of a pod 320. That is, a set of metrics is provided for each pod 320. In some examples, the set of resource metrics is a set of utilization metrics and includes CPU utilization and memory utilization. In some examples, a set of thread metrics is provided and includes a number of runnable threads, a number of threads that are executing, but waiting for other threads to finish a tasks without time limit, and a number of threads that are executing, but waiting for other threads to finish a tasks with a time limit (e.g., retrieved using a Java virtual machine (JVM) thread dump). In some examples, the set of utilization metrics and the set of thread metrics are communicated to the monitoring component 306 by the service 322.

In some implementations, the monitoring component 306 can include a monitor and time series database and a metrics adapter, each of which can be provided using Prometheus, which can be described as an open-source time series database for monitoring and includes a collection of client libraries that enable metrics to be published for collection. For example, the monitor and time series database can be provided as a Prometheus server and the metrics adapter can be provided as a Prometheus adapter. In some examples, the monitoring component 306 receives and records the set of utilization metrics and the set of thread metrics for each pod. In some examples, the monitoring component 306 executes the SLA enforcement functionality embodying the multi-tenant interference model, as described herein. In some examples, and as described herein, the monitoring component 306 can selectively transmit a message indicating that a pod is associated with a SLA violation.

For example, the monitoring component 306 can publish a message to the messaging system 308, the message including a SLA violation topic and a pod identifier (i.e., a unique identifier identifying the pod that has had an SLA violation indicated). For example, the messaging system 308 can be provided as a Kafka messaging system. In some examples, the autoscaler 310 subscribes to the SLA violation topic with the messaging system 308. Consequently, each time a message is published to the messaging system 308 and includes the SLA violation topic, the message is automatically provided to the autoscaler 310. In response to the message, the autoscaler 310 scales out the pod indicated in the message (i.e., by pod identifier). For example, and as described herein, the autoscaler 310 establishes a replica of the pod to handle requests of the application executed by the pod.

Figure 4:
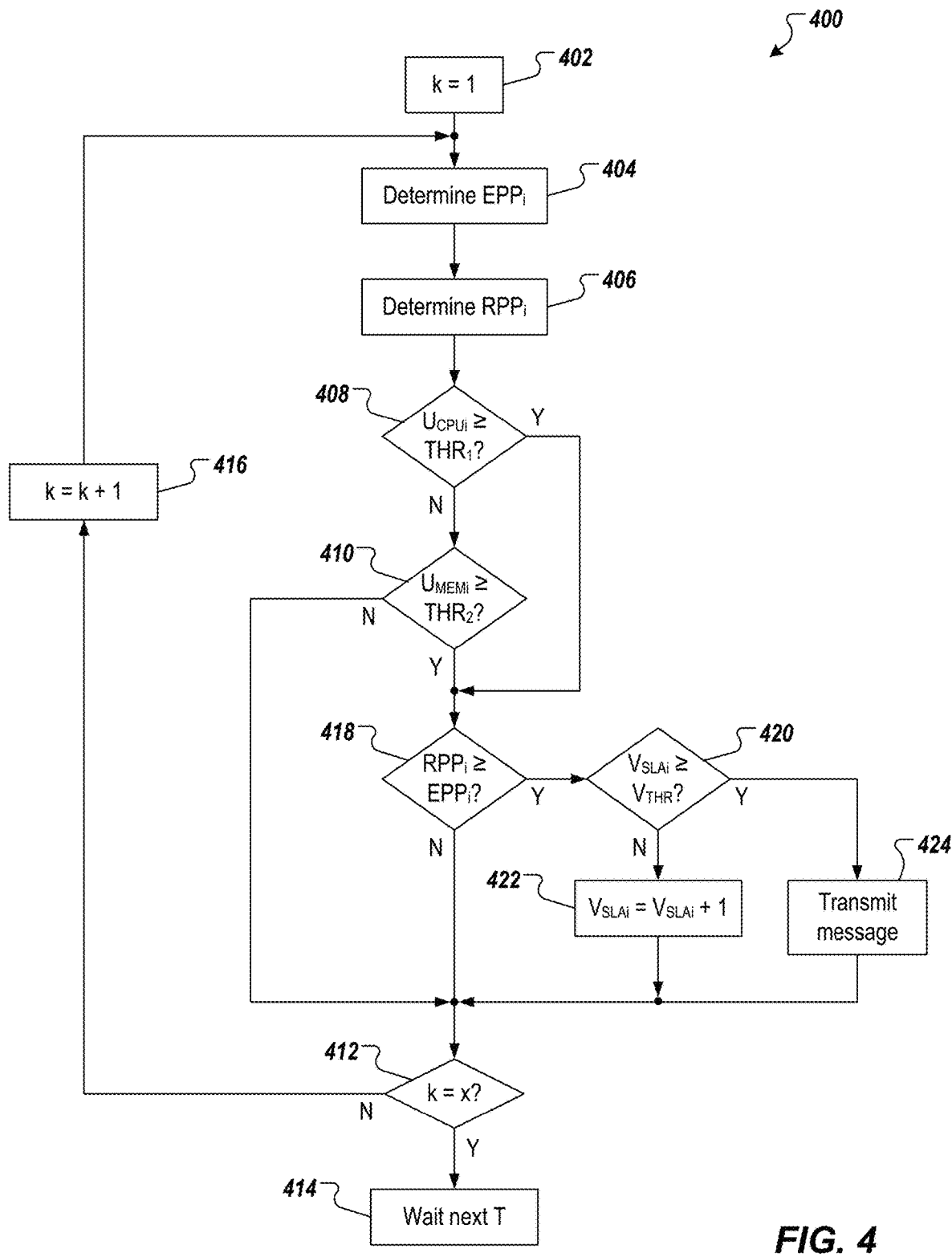
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable program executed by one or more computing devices. In some examples, the example process 400 is executed for each resource unit (pod) in a set at resource units (pods). Before execution of the example process 400 for a pod, the SLA violations count (SLA_VIOLATION, $V_{SLAi}$) is initialized to zero (0) (for the $i^{th}$ pod). In some examples, at least a portion of the example process 400 is executed by the monitoring component 306 of FIG. 3.

A counter k is set equal to 1 (402). For example, the counter k indicates a time within a time period (x) that is being considered. $EPP_i$ is determined (404) and RPP is determined (406). For example, and as described in detail herein, $EPP_i$ is calculated for $POD_i$ (where n) based on Equation 1 above, and $RPP_i$ is calculated for $POD_i$ based on Equation 2 above.

It is determined whether $U_{CPUi}$ is greater than or equal to a first threshold (408). For example, and as described herein, it is determined whether $U_{CPUi}$ is greater than or equal to 75%. If it is determined that $U_{CPUi}$ is not greater than or equal to the first threshold, it is determined whether $U_{MEMi}$ is greater than or equal to a second threshold (410). For example, and as described herein, it is determined whether $U_{MEMi}$ is greater than or equal to 75%. If it is determined that $U_{MEMi}$ is not greater than or equal to the second threshold, it is determined whether k is equal to x (412). That is, it is determined whether all times in the time period have been considered. If k is not equal to x, the counter k is incremented (414) and example process 400 loops back. If k is equal to x, the process 400 waits for a next time session t (416), and repeats.

It is determined whether $U_{CPUi}$ is greater than or equal to the first threshold or that $U_{MEMi}$ is greater than or equal to the second threshold, it is determined whether $RPP_i$ is greater than or equal to $EPP_i$ (418). If $RPP_i$ is not greater than or equal to $EPP_i$, it is determined whether k is equal to x (412), as discussed above. If $RPP_i$ is greater than or equal to $EPP_i$, it is determined whether $V_{SLAi}$ is greater than or equal to $V_{THR}$ (420). If $V_{SLAi}$ is not greater than or equal to $V_{THR}$, $V_{SLAi}$ is incremented (422) and it is determined whether k is equal to x (412), as discussed above. If $V_{SLAi}$ is greater than or equal to $V_{THR}$, a message is transmitted (424). For example, and as described herein, the monitoring component 306 publishes a message to the messaging component 308, the message including the SLA violations topic and the pod identifier. The autoscaler 310 receives the message from the messaging system 310 and scales the pod in response to the message.

Figure 5:
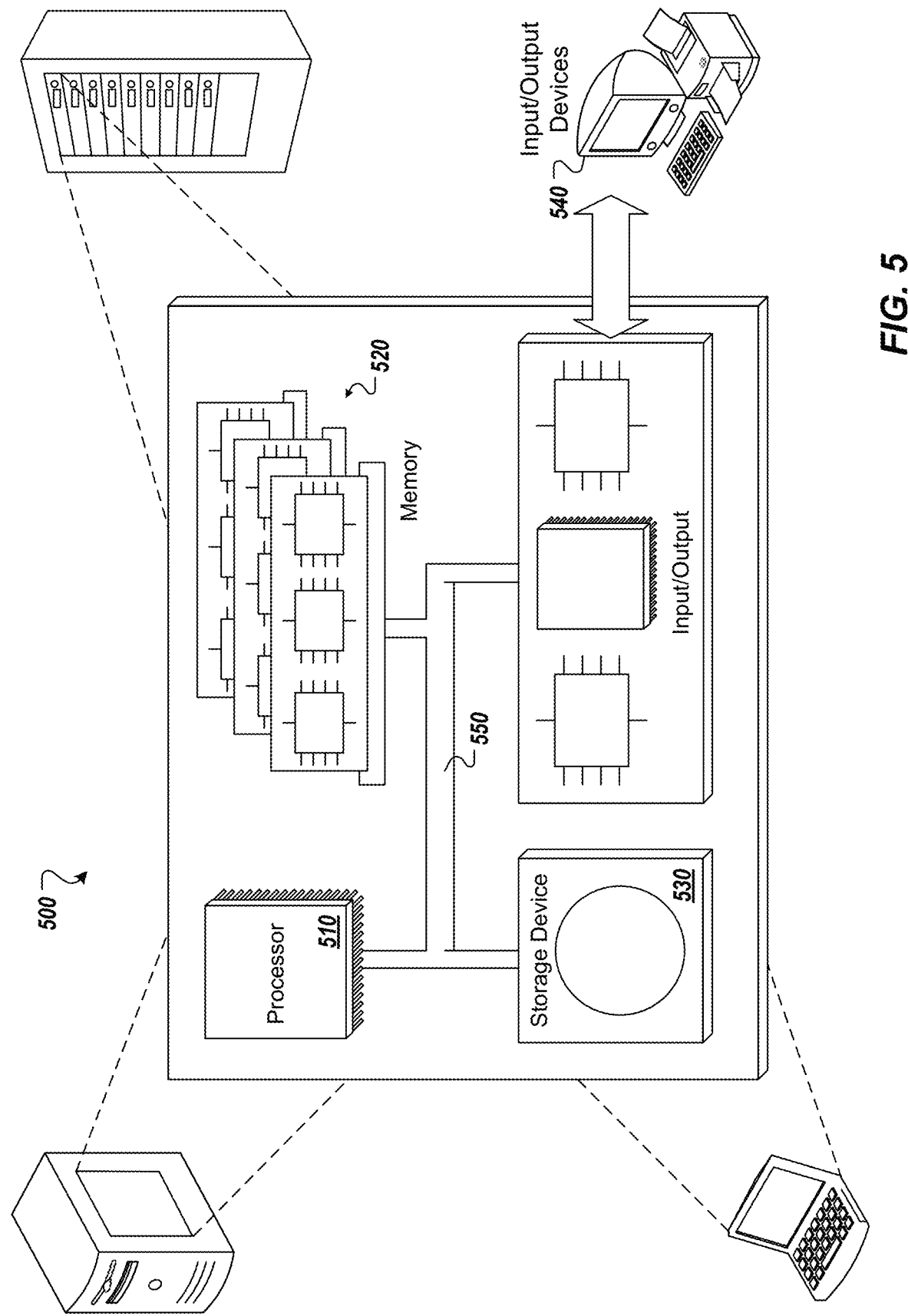
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for selectively scaling resource units in a container orchestration system, the method being executed by one or more processors and comprising:

executing, within the container orchestration system, a set of resource units, each resource unit comprising an application container executing an instance of an application;

receiving, for a first resource unit in the set of resource units, a first set of utilization metrics representing hardware utilization for the first resource unit;

determining that at least one utilization metric in the first set of utilization metrics exceeds a respective threshold, and in response:

determining whether an actual performance of the first resource unit is greater than or equal to an expected performance of the first resource unit, the actual performance being determined using a set of thread counts comprising a first thread count indicating a number of runnable threads, a second thread count indicating a number of threads that are executing, but waiting for other threads to finish tasks without time limit, and a third thread count indicating a number of threads that are executing, but waiting for other threads to finish tasks with time limit, and the expected performance being determined at least partially based on a ratio of a number of queue partitions of a messaging queue to a number of resource units processing messages from the messaging queue including the first resource unit, and in response to determining that the actual performance of the first resource unit is greater than or equal to the expected performance of the first resource unit:

determining whether a first violation count of the first resource unit is greater than or equal to a threshold violation count, and in response to determining that the first violation count of the first resource unit is greater than or equal to a threshold violation count, transmitting a message for receipt by a scaling component; and selectively scaling, by the scaling component, a number of resource units within the container orchestration system at least partially based on the message.

2. The method of claim 1, further comprising:
determining that at least one utilization metric in a second set of utilization metrics exceeds a respective threshold, the second set of utilization metrics representing hardware utilization for the second resource unit, and in response:
determining whether an actual performance of the second resource unit is greater than or equal to an expected performance of the first resource unit, and
in response to determining that the actual performance of the second resource unit is greater than or equal to the expected performance of the second resource unit:
determining whether a second violation count of the second resource unit is greater than or equal to the threshold violation count, and
in response to determining that the second violation count is less than the threshold violation count, incrementing the second violation count.

3. The method of claim 1, further comprising:
determining that at least one utilization metric in a second set of utilization metrics exceeds a respective threshold, the second set of utilization metrics representing hardware utilization for a second resource unit, and in response:
determining whether an actual performance of the second resource unit is greater than or equal to an expected performance of the first resource unit, wherein scaling the number of resource units is absent influence of a second violation count of the second resource unit in response to determining that the actual performance of the second resource unit is less than the expected performance of the second resource unit.

4. The method of claim 1, further comprising determining that no utilization metric in a second set of utilization metrics exceeds a respective threshold, the second set of utilization metrics representing hardware utilization for a second resource unit, and in response, scaling the number of resource units is absent influence of a second violation count of the second resource unit.

5. The method of claim 1, wherein the first set of utilization metrics comprises a processor utilization and a memory utilization of the first resource unit.

6. The method of claim 1, further comprising calculating the expected performance at least partially based on an optimal thread count and calculating an actual performance at least partially based on a number of running threads in the set of thread counts.

7. The method of claim 1, wherein the container orchestration system comprises Kubernetes and each resource unit comprises a pod.

8. A non-transitory computer-readable storage medium coupled to one or more processors and having instructions stored thereon which, when executed by the one or more processors, cause the one or more processors to perform operations for selectively scaling resource units in a container orchestration system, the operations comprising:
executing, within the container orchestration system, a set of resource units, each resource unit comprising an application container executing an instance of an application;
receiving, for a first resource unit in the set of resource units, a first set of utilization metrics representing hardware utilization for the first resource unit;
determining that at least one utilization metric in the first set of utilization metrics exceeds a respective threshold, and in response:
determining whether an actual performance of the first resource unit is greater than or equal to an expected performance of the first resource unit, the actual performance being determined using a set of thread counts comprising a first thread count indicating a number of runnable threads, a second thread count indicating a number of threads that are executing, but waiting for other threads to finish tasks without time limit, and a third thread count indicating a number of threads that are executing, but waiting for other threads to finish tasks with time limit, and the expected performance being determined at least partially based on a ratio of a number of queue partitions of a messaging queue to a number of resource units processing messages from the messaging queue including the first resource unit, and
in response to determining that the actual performance of the first resource unit is greater than or equal to the expected performance of the first resource unit:
determining whether a first violation count of the first resource unit is greater than or equal to a threshold violation count, and
in response to determining that the first violation count of the first resource unit is greater than or equal to a threshold violation count, transmitting a message for receipt by a scaling component; and
selectively scaling, by the scaling component, a number of resource units within the container orchestration system at least partially based on the message.

9. The non-transitory computer-readable storage medium of claim 8, wherein operations further comprise:
determining that at least one utilization metric in a second set of utilization metrics exceeds a respective threshold, the second set of utilization metrics representing hardware utilization for the second resource unit, and in response:
determining whether an actual performance of the second resource unit is greater than or equal to an expected performance of the first resource unit, and
in response to determining that the actual performance of the second resource unit is greater than or equal to the expected performance of the second resource unit:
determining whether a second violation count of the second resource unit is greater than or equal to the threshold violation count, and
in response to determining that the second violation count is less than the threshold violation count, incrementing the second violation count.

10. The non-transitory computer-readable storage medium of claim 8, wherein operations further comprise:
determining that at least one utilization metric in a second set of utilization metrics exceeds a respective threshold, the second set of utilization metrics representing hardware utilization for a second resource unit, and in response:
determining whether an actual performance of the second resource unit is greater than or equal to an expected performance of the first resource unit, wherein scaling the number of resource units is absent influence of a second violation count of the second resource unit in response to determining that the actual performance of the second resource unit is less than the expected performance of the second resource unit.

11. The non-transitory computer-readable storage medium of claim 8, wherein operations further comprise determining that no utilization metric in a second set of utilization metrics exceeds a respective threshold, the second set of utilization metrics representing hardware utilization for a second resource unit, and in response, scaling the number of resource units is absent influence of a second violation count of the second resource unit.

12. The non-transitory computer-readable storage medium of claim 8, wherein the first set of utilization metrics comprises a processor utilization and a memory utilization of the first resource unit.

13. The non-transitory computer-readable storage medium of claim 8, wherein operations further comprise calculating the expected performance at least partially based on an optimal thread count and calculating an actual performance at least partially based on a number of running threads in the set of thread counts.

14. The non-transitory computer-readable storage medium of claim 8, wherein the container orchestration system comprises Kubernetes and each resource unit comprises a pod.

15. A system, comprising: a computing device; and a computer-readable storage device coupled to the computing device and having instructions stored thereon which, when executed by the computing device, cause the computing device to perform operations for selectively scaling resource units in a container orchestration system, the operations comprising:
executing, within the container orchestration system, a set of resource units, each resource unit comprising an application container executing an instance of an application;
receiving, for a first resource unit in the set of resource units, a first set of utilization metrics representing hardware utilization for the first resource unit;
determining that at least one utilization metric in the first set of utilization metrics exceeds a respective threshold, and in response:
determining whether an actual performance of the first resource unit is greater than or equal to an expected performance of the first resource unit, the actual performance being determined using a set of thread counts comprising a first thread count indicating a number of runnable threads, a second thread count indicating a number of threads that are executing, but waiting for other threads to finish tasks without time limit, and a third thread count indicating a number of threads that are executing, but waiting for other threads to finish tasks with time limit, and the expected performance being determined at least partially based on a ratio of a number of queue partitions of a messaging queue to a number of resource units processing messages from the messaging queue including the first resource unit, and
in response to determining that the actual performance of the first resource unit is greater than or equal to the expected performance of the first resource unit:
determining whether a first violation count of the first resource unit is greater than or equal to a threshold violation count, and
in response to determining that the first violation count of the first resource unit is greater than or equal to a threshold violation count, transmitting a message for receipt by a scaling component; and
selectively scaling, by the scaling component, a number of resource units within the container orchestration system at least partially based on the message.

16. The system of claim 15, wherein operations further comprise:
determining that at least one utilization metric in a second set of utilization metrics exceeds a respective threshold, the second set of utilization metrics representing hardware utilization for the second resource unit, and in response:
determining whether an actual performance of the second resource unit is greater than or equal to an expected performance of the first resource unit, and
in response to determining that the actual performance of the second resource unit is greater than or equal to the expected performance of the second resource unit:
determining whether a second violation count of the second resource unit is greater than or equal to the threshold violation count, and
in response to determining that the second violation count is less than the threshold violation count, incrementing the second violation count.

17. The system of claim 15, wherein operations further comprise:
determining that at least one utilization metric in a second set of utilization metrics exceeds a respective threshold, the second set of utilization metrics representing hardware utilization for a second resource unit, and in response:
determining whether an actual performance of the second resource unit is greater than or equal to an expected performance of the first resource unit, wherein scaling the number of resource units is absent influence of a second violation count of the second resource unit in response to determining that the actual performance of the second resource unit is less than the expected performance of the second resource unit.

18. The system of claim 15, wherein operations further comprise determining that no utilization metric in a second set of utilization metrics exceeds a respective threshold, the second set of utilization metrics representing hardware utilization for a second resource unit, and in response, scaling the number of resource units is absent influence of a second violation count of the second resource unit.

19. The system of claim 15, wherein the first set of utilization metrics comprises a processor utilization and a memory utilization of the first resource unit.

20. The system of claim 15, wherein operations further comprise calculating the expected performance at least partially based on an optimal thread count and calculating an actual performance at least partially based on a number of running threads in the set of thread counts.

* * * * *